UNITED STATES PATENT OFFICE.

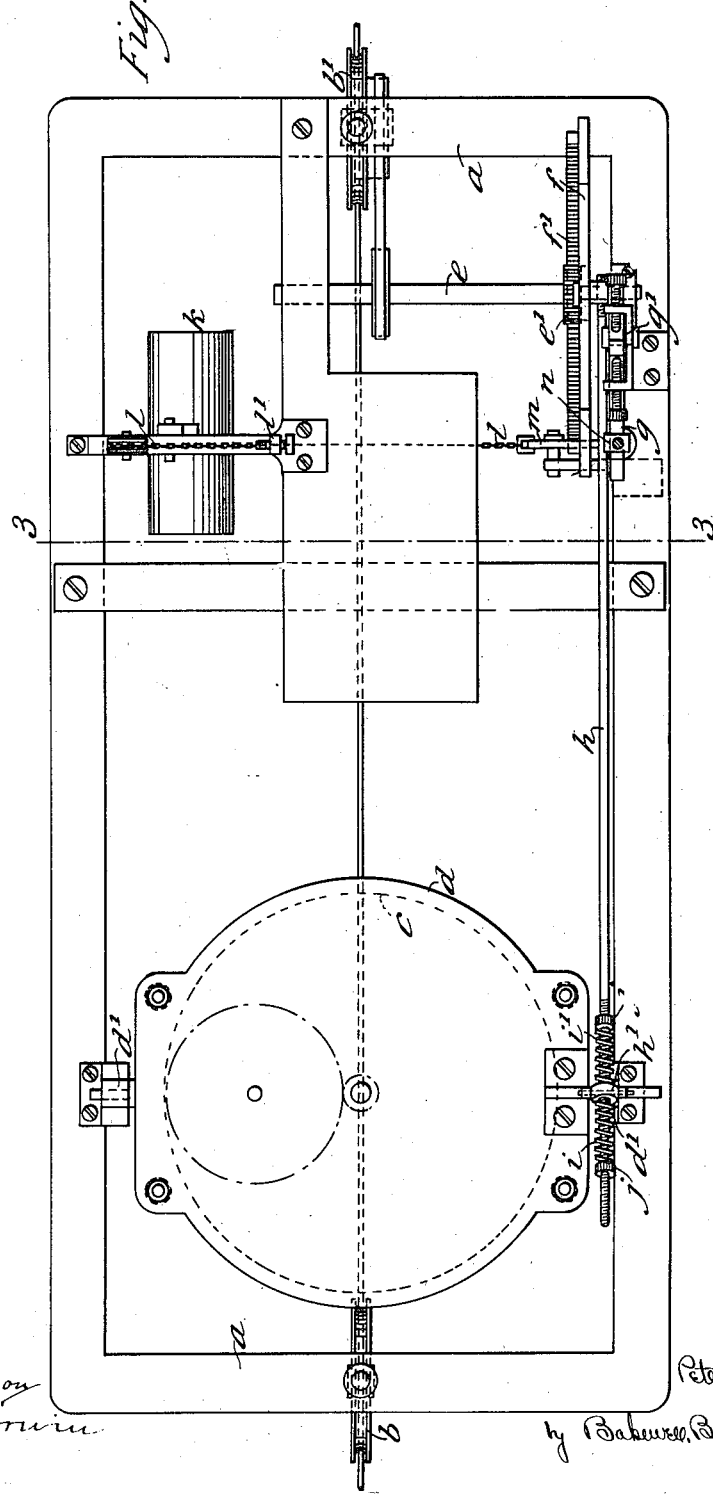

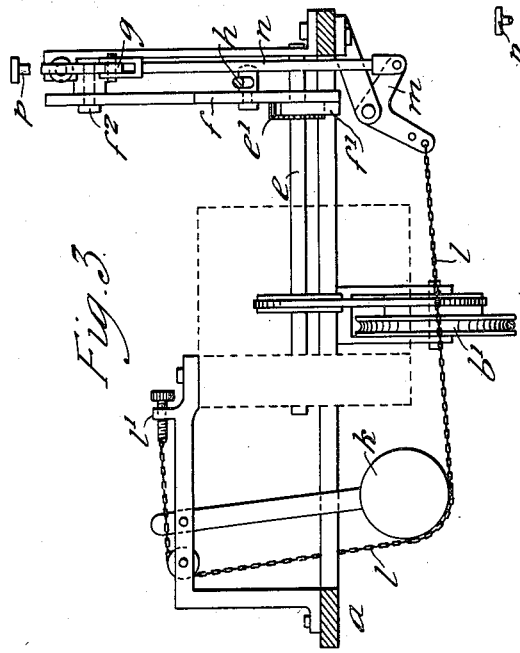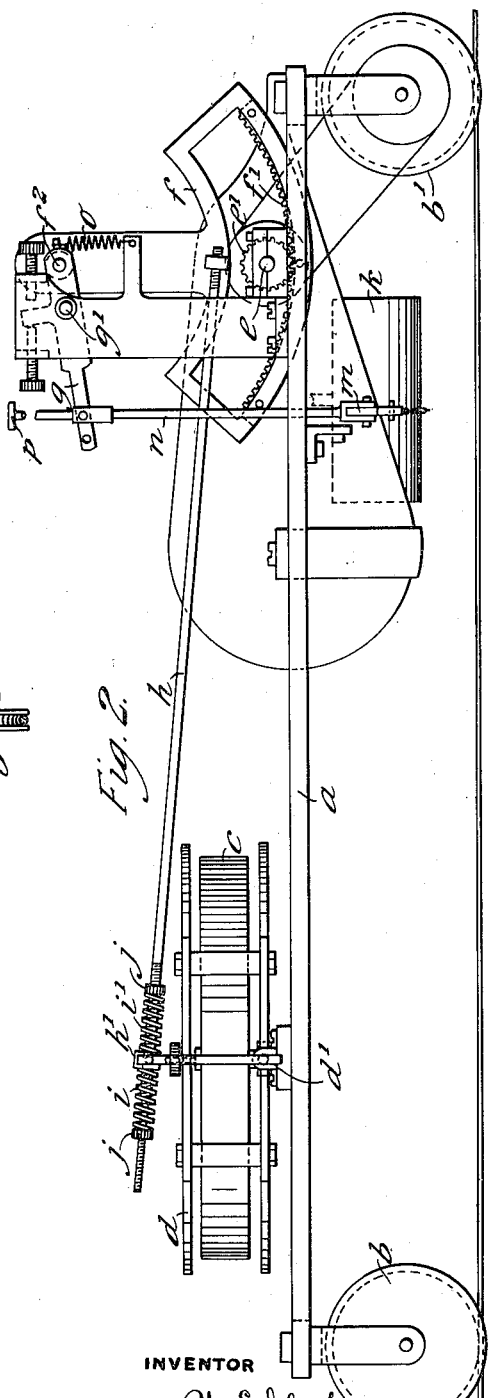

PETER SCHILOWSKY, OF SIMBIRSK, RUSSIA.

GYROSCOPE.

1,137,234.      Specification of Letters Patent.      Patented Apr. 27, 1915.

Application filed March 1, 1910. Serial No. 546,681.

*To all whom it may concern:*

Be it known that I, PETER SCHILOWSKY, a subject of the Czar of Russia, residing at Simbirsk, in Russia, vice-governor of Simbirsk, in Russia, have invented certain new and useful Improvements in Gyroscopes, of which the following is a specification.

This invention relates to means for rendering stable apparatus, which is normally in unstable equilibrium, by the action of a gyroscope or gyroscopes which are mounted in such a manner that they are themselves in unstable equilibrium, for instance by being journaled in a frame which is pivotally mounted on the apparatus with its pivot axis transverse to the line of support of the apparatus and in a plane below the center of gravity of the gyroscope. Now it is well known that when a gyroscope is so suspended that the oscillatory movement of the gyroscope mounting about its axis of suspension gives rise to a synchronous oscillating movement of the apparatus about its line of support; such swinging movement of the gyroscope arises more particularly, and its amplitude develops more quickly, when the gyroscope rotates at a comparatively low speed, but if an impulse or pressure or a series of such impulses is applied to the gyroscope mounting when it begins to oscillate, such impulses if of proper strength have the effect of annulling the swing of the gyroscope provided they are applied in the direction in which the gyroscope is swinging at the moment of application; and consequently the oscillatory movement of the apparatus due to the swinging movement of the gyroscope will be simultaneously annulled or counteracted.

This invention consists in improvements according to which the impulse or series of impulses applied, in the manner and for the purpose referred to above, are of a number and strength appropriate or proportional to the extent of the oscillation of the apparatus about its line of support.

The invention may be applied to any apparatus in which stability of movement is obtained by means of gyroscopes, but it is particularly applicable for the maintenance of the lateral stability of mono-track vehicles in general, and it will be hereinafter more particularly described with reference to such vehicles.

According to this invention therefore stability of the vehicle frame is obtained by maintaining the plane of rotation of the gyroscope in a plane at an inclination to the plane of support of the vehicle frame appropriate to the conditions of movement of the vehicle, that is to say according as the vehicle is traveling in a straight line or on a curve in a horizontal or inclined plane, and this result is arrived at by imparting a series of impulses to the gyroscope mounting which have the effect of causing it always to approximate to that plane.

By automatically applying at the appropriate moment a series of impulses to a gyroscope mounted as described, it becomes possible to obtain lateral stability of the vehicle frame with a single gyroscope, even when the gyroscope wheel is running at comparatively low speeds or is imperfectly balanced. Such impulses are imparted to the gyroscope mounting from a suitable source of power and are initiated and controlled by means of a pendulum mounted on the vehicle frame to swing transversely to the frame, and operating when the frame oscillates in a given direction to bring a constantly acting source of power into engagement with the transmitting mechanism, so as to impart to the gyroscope mounting through such mechanism a pressure or shock or impulse or a series of such impulses of a number and strength appropriate to the extent of the oscillation of the vehicle frame, such impulses being automatically applied in such a direction as will produce the result above specified. It may be arranged to communicate such impulses to the gyroscope mounting when swinging in both directions, but usually it would only be necessary to apply the impulses in the one direction or the other.

One arrangement of apparatus for carrying the invention into effect and adapted to communicate impulses to the gyroscope mounting each time it inclines in one direction, as the vehicle moves in a straight line is illustrated more or less diagrammatically in the accompanying drawings as applied to a mono-track vehicle, Figure 1 being a plan view, Fig. 2 a side elevation, and Fig. 3 a transverse section on line 3—3 of Fig. 1.

In these drawings $a$ represents the vehicle frame which is supported fore and aft on a pair of alined wheels $b$, $b'$. The gyroscope wheel $c$ is journaled in a frame or mounting $d$ which is pivotally mounted as at $d'$ transversely on the vehicle frame, the pivot axis being in a vertical plane through the center of the gyroscope when the latter is horizontal, and in a horizontal plane below the center of gravity of the gyroscope. A continuously rotating shaft $e$ driven from any suitable motor, which may be the motor driving the vehicle, is journaled in suitable bearings transversely to the vehicle frame, and carries a pinion $e'$ which is adapted to coöperate with a rack $f'$ formed or mounted on a quadrant $f$ which is fulcrumed at $f^2$. The fulcrum or support of the quadrant is capable of being raised and lowered so as to bring the rack $f'$ into and out of engagement with pinion $e'$. For example, as shown, the quadrant $f$ is pivoted on a lever $g$ fulcrumed at $g'$ on a standard fixed to the frame of the vehicle, the other end of the lever $g$ being provided with means for turning it about its fulcrum so as to thereby raise and lower the quadrant $f$.

The quadrant $f$ is elastically connected with the gyroscope mounting $d$ by means of a rod $h$ which slides through a collar $h'$ pivoted on the gyroscope mounting, a pair of springs $i$, $i'$ one on either side of the collar providing the elastic coupling. The tension of these springs is preferably adjustable as by means of nuts $j$ on the rod $h$, which is screw-threaded for this purpose.

The automatic movement of the quadrant $f$ is effected by means of a pendulum $k$ suspended from a fixed point on the vehicle frame so as to be free to swing transversely to the frame. This pendulum is so connected with the lever $g$ that when the frame inclines in one direction the lever $g$ will be actuated so as to raise the quadrant and bring the rack $f'$ into gear with the pinion $e'$. Each time such inclination of the vehicle frame occurs the pinion $e'$ will impart to the rack $f'$ a shock or impulse which is transmitted through the rod $h$ and buffer springs $i$, $i'$ to the gyroscope mounting, and as the oscillation of the vehicle frame and of the gyroscope are synchronous such shocks or impulses can be and are, in the apparatus herein illustrated, arranged to have the effect of annulling the oscillations of the gyroscope mounting and consequently of steadying the vehicle.

As shown in the drawings, the pendulum $k$ is arranged to swing against a flexible cord $l$ one end of which is fixed to the frame at $l'$ preferably with provision for altering its length, while the other end is attached to a bell crank lever $m$ which is connected by link $n$ with the lever $g$. The length of the cord $l$ is adjusted so that the rack $f'$ will be clear of the pinion $e'$ when the vehicle frame is inclined toward that side in which the pendulum $k$ will swing clear of the cord $l$, while when the vehicle frame is inclined to the other side the rack and pinion will be brought into engagement under the action of the pendulum. Should an unstable condition of the vehicle occur oscillations will arise and the vehicle frame will dip first in one direction, then in an opposite direction, the pendulum meanwhile remaining vertical as the vehicle proceeds in a straight line. As the vehicle dips to that side in which the pendulum causes the rack and pinion to engage, an impulse will be transmitted to the gyroscope mounting. The arrangement described, therefore, automatically maintains the proper plane of rotation of the gyroscope when traveling in a straight line.

It will be seen that when the vehicle is moving around a curve so that it becomes inclined by reason of centrifugal force toward that side in which the pendulum would swing against the cord if the vehicle were proceeding in an unstable condition and in a straight line, the effect of centrifugal force on the pendulum will be to tend to move it away from the cord, and when the vehicle is moving around a curve which inclines the vehicle in the opposite direction, the effect of centrifugal force on the pendulum will be to urge it against the cord. As a result the arrangement described adapts itself automatically to maintaining the proper plane of rotation of the gyroscope when the vehicle is traveling in a curved line. Further, it will be seen that when the vehicle travels up or down hill, since the gyroscope will continue to rotate in a horizontal plane and the point of connection between the gyroscope and rod $h$, and the pinion $e'$ is therefore changed, the effective length of the connecting rod will be automatically adjusted to suit the altered conditions.

The rack $f'$ is normally kept out of engagement with the pinion $e'$ by means of a spring $o$ one end of which is connected with the end of the lever $g$ and the other end with the vehicle frame, means being preferably provided to vary the tension of the spring. Also it is preferable to provide means for bringing the pinion $e'$ into engagement with the rack $f'$ independently of the automatic mechanism and this may be done by means of a rod and handle such as $p$ fixed to the lever $g$, so that impulses may thereby be imparted to the gyroscope mounting manually. A similar arrangement to that described may be employed for imparting impulses to the gyroscope frame as the vehicle frame dips in a direction opposite to that in which the described arrangement imparts impulses to the gyroscope frame.

While the method of communicating shocks or impulses to the gyroscope mounting has been found to be satisfactory in practice, it is to be understood that the invention is not to be considered as limited to the specific means described but that any suitable arrangement for automatically originating and controlling these impulses may be substituted for that described.

Having thus described my invention and the best means I know of carrying the same into practical effect, I claim:—

1. Means for imparting lateral stability to a body naturally unstable, comprising a rotating gyroscope wheel, a frame supporting the wheel and pivotally mounted on the body with its pivot axis transverse to the line of support of the body, and in a plane lying between the said line of support and the center of gravity of the wheel, a constantly acting source of power and mechanism adapted to transmit intermittently impulses from the source of power to the frame at the moment oscillating, said mechanism comprising a transmitting member connected to the frame, and means on the body independent of and entirely separate from the gyroscope frame automatically operating when the body oscillates in one direction about its line of support, to cause a driving connection between the said member and the constantly acting source of power.

2. Means for imparting lateral stability to a body naturally unstable, comprising a rotating gyroscope wheel, a frame supporting the wheel and pivotally mounted on the body with its pivot axis transverse to the line of support of the body and in a plane lying between the said line of support, the center of gravity of the wheel, a constantly acting source of power and mechanism adapted to transmit intermittently impulses from the source of power to the frame, said mechanism comprising a transmitting member connected to the frame, and means on the body independent of and entirely separate from the gyroscope frame automatically operating when the body oscillates in one direction about its line of support, to cause a driving connection between the said member and the constantly acting source of power, and means automatically operating to disconnect the source of power and the said mechanism as an oscillation of the body terminates so that the period of a series of impulses is proportional to the extent of the synchronous oscillations of the body.

3. Means for imparting lateral stability to a body naturally unstable, comprising a rotating gyroscope wheel, a frame supporting the wheel and pivotally mounted on the body and in a plane lying between the said line of support and the center of gravity of the wheel, a constantly acting source of power and mechanism adapted to transmit intermittently impulses from the source of power to the frame, said mechanism comprising a transmitting member connected with the frame and means on the body independent of and entirely separate from the gyroscope frame automatically operating when the body oscillates about its line of support, to cause a driving connection between the said member and the constantly acting source of power, a hanging weight mounted on the body to move transversely to the line of support thereof, and means rendered operative by said pendulum for connecting intermittently the said member and the constantly acting source of power.

4. Means for imparting lateral stability to a body naturally unstable, comprising a rotating gyroscope wheel, a frame supporting the wheel, and pivotally mounted on the body with its pivot axis transverse to the line of support of the body and in a plane lying between the said line of support and the center of gravity of the wheel, a constantly acting source of power, and mechanism adapted to transmit intermittently impulses from the source of power to the frame, said mechanism comprising a transmitting member connected to the frame, and means on the body independent of and entirely separate from the gyroscope frame automatically operating when the body oscillates in one direction about its line of support, to cause a driving connection between the said member and the constantly acting source of power, a pendulum mounted on the body to swing transversely to the line of support thereof, means rendered operative by said pendulum for connecting intermittently the said member and the constantly acting source of power, and means automatically operating to disconnect the source of power and the said member as an oscillation of the body terminates so that the period of a series of impulses is proportional to the extent of the synchronous oscillations of the body.

5. Means for imparting lateral stability to a body naturally unstable, comprising a gyroscope which includes a wheel rotating on a frame pivotally mounted on the body with its pivot axis transverse to the line of support of the body and in a plane between said line of support and the center of gravity of the gyroscope wheel, a continuously rotating pinion, a pivoted quadrant rack elastically coupled with the frame work and adapted to engage the pinion, a pendulum mounted to swing transversely to the line of support of the body, and means actuated and controlled by the pendulum and adapted to bring the rack and pinion intermittently into engagement.

6. Means for imparting lateral stability to a body naturally unstable, comprising a gyroscope which includes a wheel rotating on a frame pivotally mounted on the body with its pivot axis tranverse to the line of support of the body and in a plane between said line of support and the center of gravity of the gyroscope wheel, a continuously rotating pinion, a pivoted quadrant rack elastically coupled with the frame work and adapted to engage the pinion, a pendulum mounted to swing transversely to the line of support of the body, and means actuated by the pendulum for raising and lowering the pivoted point of support of the rack so as to bring the latter into and out of gear with the pinion.

7. Means for imparting lateral stability to a body naturally unstable, comprising a gyroscope which includes a wheel rotating on a frame pivotally mounted on the body with its pivot axis transverse to the line of support of the body and in a plane between said line of support and the center of gravity of the gyroscope wheel, a continuously rotating pinion, a pivoted quadrant rack elastically coupled with the frame work and adapted to engage the pinion, a pendulum mounted to swing transversely to the line of support of the body, mechanism for raising and lowering the point of support of the rack so as to bring the latter into and out of gear with the pinion, and a flexible connection connected with the said mechanism and adapted to be placed under tension by the pendulum when the body frame inclines toward one side of its line of support and thereby actuate the said mechanism.

8. Means for imparting lateral stability to a body naturally unstable, comprising the combination of a rotating gyroscope wheel, a frame supporting the wheel and pivotally mounted on the body with its pivot axis transverse to the line of support of the body and in a plane lying between the said line of support and the center of gravity of the wheel, a constantly acting source of power, and mechanism adapted to transmit intermittently impulses from the source of power to the frame, said mechanism comprising a transmitting member connected to the frame, and means on the body independent of and entirely separate from the gyroscope frame automatically operating when the body oscillates in one direction about its line of support, to cause a driving connection between the said member and the constantly acting source of power, with manually operable means for connecting the said source of power with the gyroscope frame independently of the said automatically operating means.

In testimony whereof I have signed my name to this specification in the presence of two subscribing witnesses.

PETER SCHILOWSKY.

Witnesses:
JOHN H. SNODGRASS,
HELEN B. SNODGRASS.